United States Patent [19]

Brooks et al.

[11] Patent Number: 4,467,011
[45] Date of Patent: Aug. 21, 1984

[54] INJECTION MOLDABLE AMIDE-IMIDE POLYMERS AND COPOLYMERS CONTAINING AMORPHOUS POLYAMIDES

[75] Inventors: Gary T. Brooks; Bill W. Cole, both of Naperville, Ill.

[73] Assignee: Standard Oil Company (Indiana), Chicago, Ill.

[21] Appl. No.: 383,268

[22] Filed: May 28, 1982

[51] Int. Cl.³ .............................................. B32B 7/00
[52] U.S. Cl. .................................. 428/245; 428/260; 428/273; 428/408; 428/902; 428/322.2; 428/423.3; 428/473.5; 428/474.7
[58] Field of Search ............... 428/251, 260, 268, 273, 428/408, 474, 902, 245

[56] References Cited

U.S. PATENT DOCUMENTS

| | | | |
|---|---|---|---|
| 3,347,828 | 10/1967 | Stephens | 528/182 |
| 3,573,260 | 3/1971 | Morello | 528/188 |
| 3,661,832 | 5/1972 | Stephens | 528/350 |
| 4,016,140 | 4/1977 | Morello | 528/350 |
| 4,224,214 | 9/1980 | Chen | 524/451 |
| 4,309,528 | 1/1982 | Keske et al. | 528/188 |
| 4,313,868 | 2/1982 | Hanson | 528/188 |

Primary Examiner—James J. Bell
Attorney, Agent, or Firm—Gunar J. Blumberg; William T. McClain; William H. Magidson

[57] ABSTRACT

Flow properties of polyamide-imide polymers are improved by the addition of amorphous polyamides. These polymers are useful as engineering resins, laminates, and molded objects.

6 Claims, 5 Drawing Figures

EFFECT OF TROGAMID-T ON AMIDE-IMIDE (40% GLASS FIBERS) FLOW AND STABILITY (EXAMPLE II PREPARATION)

NEAT AMIDE-IMIDE
(EXAMPLE I PREPARATION)

FIG. 5

INJECTION MOLDABLE AMIDE-IMIDE POLYMERS AND COPOLYMERS CONTAINING AMORPHOUS POLYAMIDES

BACKGROUND OF THE INVENTION

1. Field of the Invention

The field of this invention relates to polyamide-imide polymers containing amorphous polyamides and to molding powders and molded articles prepared therefrom.

2. Background

Amide-imide polymers and copolymers are a relatively new class of organic compounds known for their solubility in nitrogen containing solvents when in the largely polyamide form. In the past the major application of these amide-imide polymers has been as wire enamels. This is illustrated in U.S. Pat. Nos. 3,661,832 (1972), 3,494,890 (1970) and 3,347,828 (1967). Amide-imide polymers and copolymers have also been found useful for molding applications as shown in U.S. Pat. Nos. 4,016,140 (1977) and 3,573,260 (1971). U.S. Pat. Nos. 4,136,085 (1979), 4,313,868 (1982), and 4,309,528 (1982) are incorporated herein by reference. These polyamides are known for their outstanding mechanical properties, but they are also difficult to process, particularly to injection mold. This difficulty is a consequence of insufficient flow of the polymer. The art has been looking for improvements in the flow and reduction in melt reactivity during fabrication of the polymers, but it is essential that an additive not impair the excellent mechanical properties of the polyamide-imide polymers and copolymers, particularly the flexural and heat deflection properties. The ideal flow improving agent for these polymers would be one which plasticizes the polymers during injection molding and cross-links links the polymers and copolymers during the curing or annealing step so that the plasticizing effect would be neutralized by cross-linking.

The general object of this invention is to provide polyamide-imide polymers and copolymers containing amorphous polyamides. A more specific object of this invention is to provide polyamide-imide polymers and copolymers suitable for use as engineering plastics and high pressure laminates particularly for use in injection molding wherein the polymer flow is improved while its melt reactivity is hindered by the addition of up to about 20 percent by weight of amorphous polyamides. Other objects appear hereinafter.

I have now found that amide-imide polymers and copolymers obtained by reacting a polycarboxylic acid anhydride with one primary diamine or a mixture of primary diamines containing up to 20 percent of amorphous polyamides have excellent flow properties and can readily be injection molded to provide engineering plastics with excellent properties but which can be produced or molded at a much faster rate since the polymer flow has been substantially increased when compared to the polymers which do not contain amorphous polyamides. The amorphous polyamides improve the flow and reduce the melt reactivity of neat or filled amide-imide polymers and also when glass fibers, glass beads, mineral fillers, graphite fiber or graphite powder are coated with the amorphous polyamide, these can more readily be incorporated into a molded amide-imide object. Amorphous polyamides have also been found to aid the manufacture of amide-imide impregnated graphite woven fiber laminates. Suitable amorphous polyamides have both aromatic and aliphatic moieties. Advantageously, the amorphous polyamide comprises recurring units of the following structure:

wherein Y is a straight chain of one to six methylene groups, said chain being substituted by at least one alkyl group, the total number of side chain carbon atoms introduced by the alkyl substitution being at least one.

Another amorphous polyamide group suitable for use in improving the melt flow and reducing the melt reactivity of our amide-imide polymer has the following structure:

Amorphous polyamides of the following structure are preferred for use in our process, both for flow improvement and for coating the glass fibers, glass beads, mineral fillers or graphite fibers incorporated into a molded polyamide-imide object of this invention.

The amorphous polyamide, Trogamid-T, manufactured by the Dynamit Nobel Company, has the following structure and is particularly useful in improving the flow properties and reducing the melt reactivity of the polyamide-imide:

wherein X is $CH_2$.

Another very useful amorphous polyamide is Amidel, manufactured by Union Carbide Company and having the following structure:

more particularly wherein the first X is $(CH_2)_7$, the second X is $CH_2$ and the third X is $(CH_2)_4$.

Other useful polyamides include the Upjohn amorphous polyamide of the following structure:

wherein the first X is $(CH_2)_9$ and the second X is $CH_2$, and the copolyamide of the following structure:

wherein X is $(CH_2)_6$.

In all of the foregoing structures X can be a straight chain of one to five $CH_2$ groups. X can be the same or different in each amorphous polyamide moiety.

Figure 1:
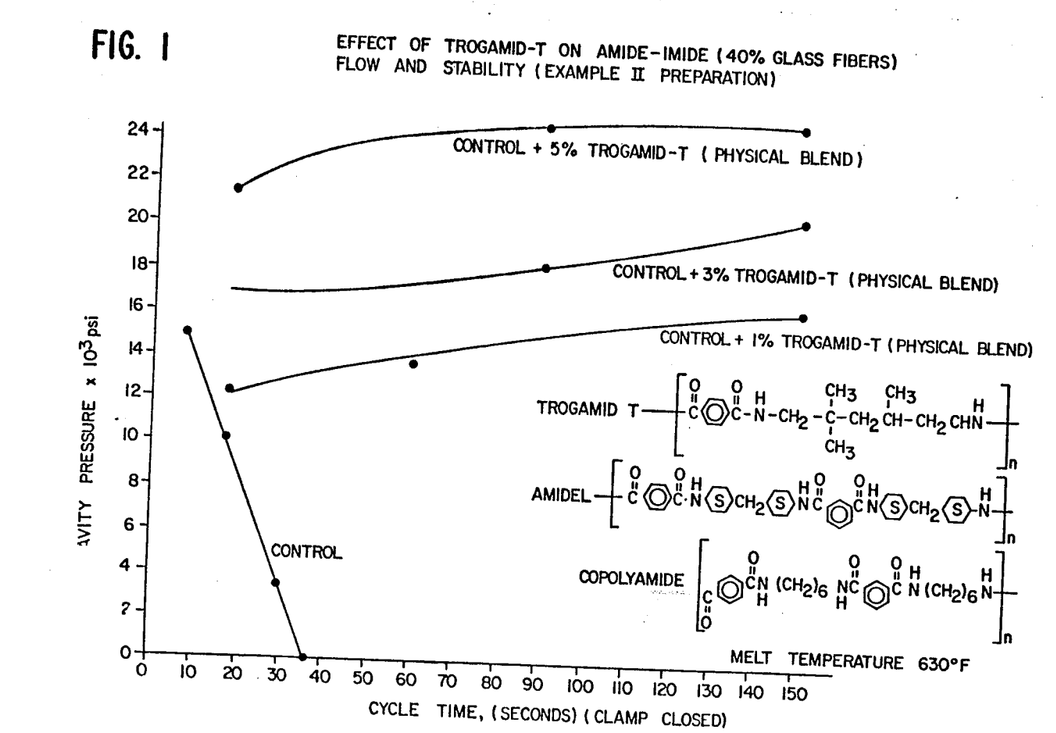
Figure 2:
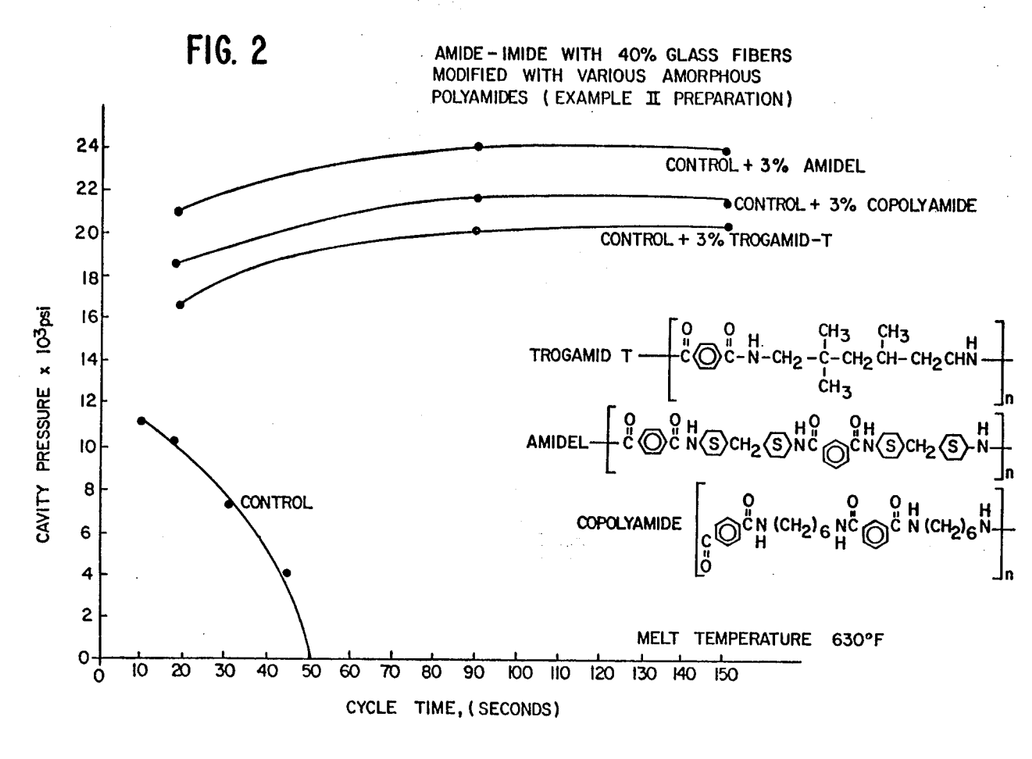
Figure 3:
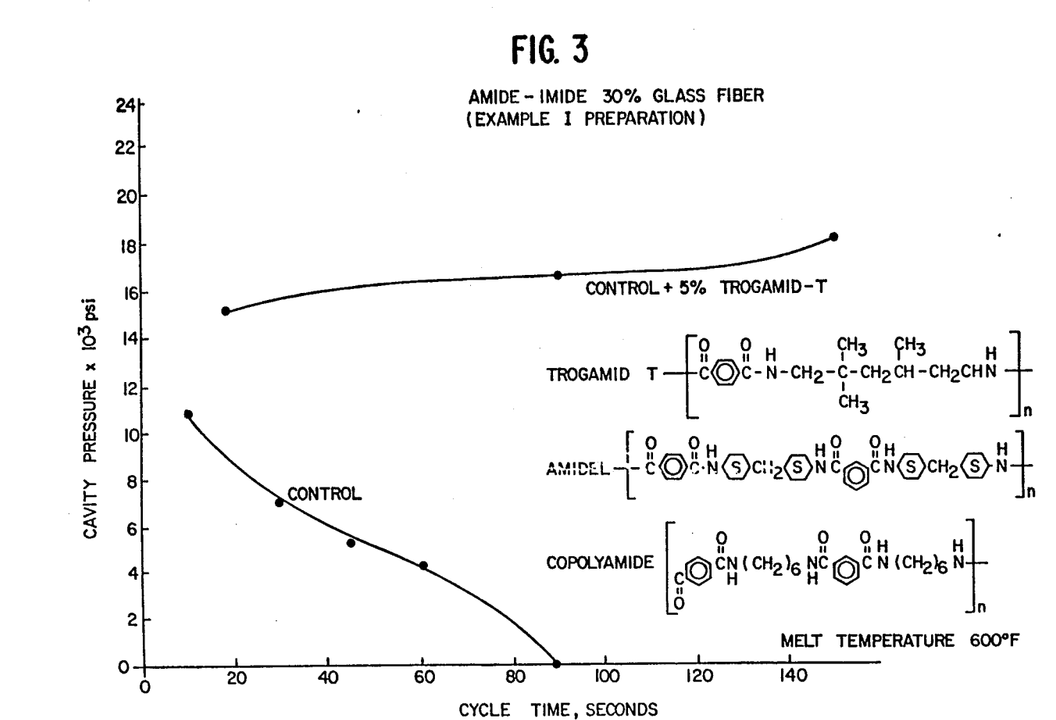

FIG. 1 shows that the amide-imide resins of our invention are very reactive in that the cavity pressure can drop down about 14,000 psi to 0 psi after only a 20 to 30 second increase in cycle time. Particular attention is drawn to steep negative slopes of the control in FIG. 1. The control is an amide-imide polymer filled with 40 percent glass fibers prepared in Example II. When about 1 percent, 3 percent, and 5 percent of an amorphous polyamide were dry blended with our glass fiber filled amide-imide polymer, a drastic improvement in melt stability and flow occurred. This is clearly shown in FIG. 1, wherein the amorphous polyamide stabilized amide-imide was compared with the unstabilized amide-imide polymer. That Figure shows that a 110 percent improvement in flow occurred with the 5 percent amorphous polyamide-imide blend with respect to the amide-imide control sample. Equally significant is that the amide-imide melt reactivity is reduced when the amorphous polyamide is added, thus the flow increased as the cycle time increased. This is clearly contrary to the behavior of an amide-imide polymer not containing amorphous polyamides. The same is shown in FIG. 2 where different amorphous polyamides are used.

The amount of the amorphous polyamide added to the amide-imide polymer can be about 0.1 to 20 weight percent, usually in the range of about 0.1 to about 10 percent. The amorphous polyamide is miscible in our amide-imide polymers, thus forming a single glass transition (Tg) matrix. When 5 weight percent of the amorphous polyamide such as Trogamid-T was dry blended with our amide-imide polymer (see Example I) and was molded, a single Tg was found. The Tg of our amide-imide polymer used as a control was 257° C. as molded while the polymer containing 5 percent by weight of Trogamid-T had a glass transition temperature of about 254° C. After being cured at a temperature of 160° C. to 260° C., the glass transition temperature for our control polyamide-imide polymer rose to 277° C. and for the sample containing 5 percent Trogamid-T rose to 237° C. An increase in Tg also occurred with amide-imide resin with glass fiber filler. For a 40 percent glass filled resin as given in Example IX, the glass transition temperature increased by 43° F. This clearly demonstrates that imidization and solid state polymerization occurred during post cure. The amorphous polyamides reduce the reactivity of our amide-imide polymer melt while allowing solid state polymerization during post cure. Thus, with these amorphous polyamides excellent post cure can be carried out and it is during this post cure that the excellent physical and thermal properties of our amide-imide polymer containing amorphous polyamides are obtained.

Amide-imide materials build their properties during the annealing step such that as molded properties are significantly below the annealed properties as illustrated in Table 1 below. To build amide-imide properties, parts are annealed at temperatures up to about 530° F. but preferably 500° F. Since the amorphous polyamides are miscible in the amide-imides, the blend Tg falls between the two constituents. It is important that the blend Tg is maintained above the maximum annealing temperature such that optimum properties can be built during annealing. It is also important that the blend Tg is above the maximum annealing temperatures so that part distortion due to stress relaxation does not occur.

TABLE 1

|  | As Molded | Annealed at 500° F. |
|---|---|---|
| % Glass Loading | 40 | 40 |
| Injection Molding Temperatures | 600 | 600 |
| Physical Properties |  |  |
| Tensile Strength (psi) | 13,500 | 33,600 |
| Tensile Elongation (%) | 1.7 | 4.2 |
| Tensile Modulus (psi) | 1,680,000 | 1,820,000 |
| HDT °F. | 479 | 546 |
| Izod Impact ft.-lbs. in. of notch | 0.92 | 1.14 |

After cure a representative 5 percent Trogamid-T neat amide-imide sample had total shrinkage of 8.7 mils per inch, while the control had a shrinkage of 7 mils per inch.

It should be particularly emphasized that when our amides are blended with amorphous polyamides a one phase miscible amide-imide amorphous polyamide system is obtained. This is critical in the effectiveness of our process and our novel process and novel compositions since if a one phase miscible system is not formed, delamination of the incompatible components can readily occur with a multiphase polymer system.

Amorphous polyamides coated on sized fillers such as glass fibers give better molding characteristics and higher cavity pressures. This allows for higher filler content without restricting the flow. Thus polyamide-imide polymers and copolymers, containing 20 to 60 percent filler can be marketed without loss of the excellent physical properties of our amide-imide polymers. The amorphous polyamide stabilized polymers of this invention are prepared by reacting an acyl halide derivative of an aromatic tricarboxylic-acid-anhydride with one or a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7–13,000 as prepared) polymeric compounds having in their molecule units of:

and units of:

and, optionally, units of:

wherein the free carboxyl groups are ortho to one amide group, Z is an aromatic moiety containing 1 to 4 benzene rings or lower-alkyl-substituted benzene rings; $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —$SO_2$—, —S—; for example, —R'—O—R'—, —R'—CH$_2$—R'—, —R'—CO—R'—, —R'—$SO_2$—R'— and —R'—S—R'—.

Said polyamides are capable of substantially complete imidization by heating, by which they form the polyamide-imide structure having to a substantial extent reoccurring units of:

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

Our process is also useful for improving the flow compositions of polyamide-imide of the foregoing composition wherein between about 20 to 80 percent of imide-containing moieties are replaced by the following composition:

wherein $R_4$ is the same as $R_1$, $R_2$ or $R_3$ and X is a divalent aromatic radical. The preferred composition for X is or a mixture of these.

The polyamide-imide copolymers are prepared from an anhydride-containing substance and a mixture of wholly- or partially-aromatic primary diamines or fully or partially acylated diamines. The process using acylated diamines is disclosed in U.S. Pat. No. 4,309,528 incorporated herein by reference. Usefully the anhydride-containing substance is an acyl halide derivative of the anhydride of an aromatic tricarboxylic acid which contains 1 to 4 benzene or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and most preferably, the substance is the acyl chloride derivative of trimellitic acid anhydride (4-TMAC). Up to 80 percent of the dianhydride can be replaced by aromatic diacids such as terephthalic acid or isophthalic acid. The process is disclosed in U.S. Pat. No. 4,313,868, incorporated herein by reference.

We can use a single diamine but usefully the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —$SO_2$—, —CO—, or methylene group. When three diamines are used they are preferably selected from the class composed of:

said X being an —O—, —$CH_2$—, or —$SO_2$— group. More preferably, the mixture of aromatic primary diamines is in the one component or two-component and is composed of meta-phenylenediamine and p,p'-oxybis(aniline) and meta-phenylenediamine, or p,p'-sulfonylbis(aniline) and p,p'-methylenebis(aniline). Most preferably, the mixture of primary aromatic diamines contains meta-phenylenediamine and p,p'-oxybis(aniline). In the one component system the preferred diamines are oxybis (aniline) or meta-phenylene diamine. The aromatic nature of the diamines provides the excellent thermal properties of the homopolymer copolymers while the primary amine groups permit the desired imide rings and amide linkages to be formed.

Usually the polymerization or copolymerization is carried out in the presence of a nitrogen-containing organic polar solvent such as N-methylpyrrolidone, N,N-dimethylformamide and N,N-dimethylacetamide.

The reaction should be carried out under substantially anhydrous conditions and at a temperature below about 150° C. Most advantageously, the reaction is carried out from about 20° C. to about 50° C.

The reaction time is not critical and depends primarily on the reaction temperature. It may vary from about 1 to about 24 hours, with about 2 to 4 hours at about 30° C. to 50° C. preferred for the nitrogen-containing solvents.

Cavity pressure measurements are used as quality control checks of polyamide-imide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

We have found that resins that have low cavity pressure process poorly and that spiral flow measurements were not sensitive enough to discriminate between resins in the viscosity range of interest. Low cavity pressures indicate a large pressure drop between injection and cavity pressures. This indicates higher resin viscosities. In the same manner high cavity pressures indicate less pressure change between injection and cavity pressures, suggesting lower resin viscosities.

Amide-imide polymer and copolymer viscosities had been measured by spiral flow determinations previous to the implementation of the cavity pressure procedure, see U.S. Pat. No. 4,224,214. Cavity pressure was selected over spiral flow because of its greater sensitivity. The cavity pressure test has been implemented as an amide-imide homopolymer and copolymer quality control procedure. Like spiral flow, cavity pressure is a test that can be done conveniently in a molder's shop.

The injection molding machine was equipped with a horizontally mounted thermoset screw and barrel assembly. The mold was heated with hot oil from a Mokon Model 105-057 heating unit. Cavity pressure was recorded with a Control Process Model 241 recorder. The mold was equipped to handle pressure transducers at the ejector pins located at the gate end of the tensile bar and the gate end of the flex bar before we began our work. Since it was desirable to make cavity pressure measurements at the dead end of the flex bar, it was necessary to make some modifications in the mold base to accommodate a transducer at this pin position.

Resins were dried in a desiccant hot air circulating oven at 300° F. for at least 16 hours before testing. Moisture in amide-imide homopolymer copolymers has a very significant effect on their flow properties; therefore, special care was taken to be sure the samples were properly dried. This drying procedure was used before making flow rate and cavity pressure measurements.

The flow rate procedure was patterned after the standard method described in ASTM D1238. A 335° C. (635° F.) barrel temperature with a 30 minute preheat time was used. This is about the largest set of weights that can be used safely with the standard extrusion plastometer apparatus. A standard 0.0825 in. diameter, and a 0.315 in. long orifice was used.

Special care was taken to be sure that each flow rate measurement was started when an equivalent volume of resin was in the barrel. Previous rheology work indicated that there is a very large "barrel height" effect on amide-imide homopolymers and copolymers. Each flow rate measurement was initiated while the top of the piston collar was between the two scribe marks on the piston. This precaution is also required by ASTM in method D1238.

Laminates of amide-imide homopolymer and copolymer solution impregnated graphite fiber woven fabric have been produced at lower molding pressures when up to 10 percent by weight of amorphous polyamide is added to the impregnation solution.

The blended solution was used to coat 26"×42" pieces of graphite fiber woven fabric. The fabric was woven from Thornel 300 fiber into an 8 harness satin weave weighing 370 g/m². Both solution and fabric were preweighed to yield 35 percent dry resin content coated fabric after solvent extraction. The fabric was taped to polyethylene film and the solution was worked into the fabric with a propylene squeegee. The coated fabric was dried at ambient until tack free, then oven dried at 300° F. for 16 hrs. After drying, the fabric was cut to size and loaded in a mold preheated to 650° F. The mold was partially closed on 0.250" shims for 5 minutes to allow additional devolitization while the material and the mold were heated to the 650° F. mold temperature. Full pressure was applied for 5 minutes followed by a double bump (partial opening of mold) to allow venting of entrapped volatile matter. The laminates were then cooled to 450° F. for demolding.

It has been found that the amide-imide homopolymers and copolymers are improved by the addition of amorphous polyamide coated or sized reinforcing material; particularly the mechanical properties of the polyimides are improved if these copolyimides contain from about 20 to 60 percent by weight glass fibers, glass beads, industrial materials such as talc, or graphite or mixtures thereof. In the preferred range the polyimides contain 30 to 40 percent by weight of the glass fibers, glass beads, talc or graphite or mixtures thereof. Suitably reinforcing materials can be glass fibers, glass beads, glass spheres, and glass fabrics. The glass fibers are made of alkali-free boron-silicate glass or alkali-containing C-glass. The thickness of the fiber is suitably on the average between 0.003 mm and 0.03 mm. It is possible to use both long fibers with average lengths of from 1.5 to 15 mm and also short fibers of an average filament length from 0.05 to 5 mm. In principle, any standard commercial-grade fibers, especially glass fibers, may be used. Glass beads ranging from 0.005 mm to 0.8 mm in diameter may also be used as a reinforcing material.

The reinforced polyamide-imide homopolymers and copolymers may be prepared in various ways. For example, so-called roving endless glass fiber strands are coated with the amorphous polyamides disclosed herein and then are further coated with the polyamic acid melt and subsequently chopped. The chopped fibers or the glass beads coated with amorphous polyamides may also be mixed with granulated polyamic acid and the resulting mixture melted in a conventional extruder, or alternatively the fibers coated with amorphous polyamide may be directly introduced into the polyamic acid melt through a suitable inlet in the extruder. Injection molding of the unfilled or glass-filled copolyamide-imides accomplished by injecting the copolyamide-imides into a mold maintained at a temperature of about 350° F. to 450° F. In this process a 15 to 30 second cycle is used with a barrel temperature of about 580° F. to 640° F. The injection molding conditions are given in Table 2.

TABLE 2

| | Set Points |
|---|---|
| Cylinder Temperatures (°F.) | |
| Nozzle | 630 |
| Front Zone | 630 |
| Rear Zone | 620 |
| Timer (seconds) | |
| Clamp Closed (cure) | 18 |
| Injection Hold | 6 |
| Booster (Inj. Hi) | 2 |
| Cycle Delay (open) | 1 |
| High-Low | 2 |
| Injection Pressure (psi) | |
| High | 20,000 |
| Low | 10,000 |
| Machine Settings | |
| Clamp Pressure (tons) | Max. |
| Injection Rate | Max. |
| Screw RPM | 50 |
| Feed Setting | As required |
| Cushion | ¼" |
| Back Pressure (psi) | 220 |
| Mold Temperature (°F.) | |
| Stationary | 450 |
| Movable | 450 |
| Hopper Drier | 220 |

The mechanical properties of the unfilled amide-imide copolymers containing amorphous polyamides (melt compounded) and also the filled amide-imide copolymers are given in Table 3 and it shows that these homopolymers and copolymers have excellent mechanical and thermal properties despite the fact that they contain 4 to 5 weight percent of amorphous polyamides.

TABLE 3

| | Amide-Imide (Example I Preparation) | | Amide-Imide (Example I Preparation) | | Amide-Imide (Example II Preparation) | | Amide-Imide (Example I Preparation) | |
|---|---|---|---|---|---|---|---|---|
| Mineral Fiber Content, % | 0 | 0 | 0 | 0 | 0 | 0 | 40 | 40 |
| Glass Fiber Content, % | 0 | 0 | 30 | 30 | 40 | 40 | 0 | 0 |
| % Trogamid-T* | 0 | 5 | 0 | 4.3 | 0 | 5 | 0 | 5 |
| Annealed Properties | | | | | | | | |
| Tensile Strength × $10^3$ psi | 28.9 | 25.4 | 31.0 | 29.9 | 30.6 | 26.2 | 21.2 | 18.0 |
| Tensile Elongation % | 14.2 | 17.1 | 7.45 | 6.84 | 5.7 | 4.8 | 3.7 | 3.5 |
| Flexural Strength × $10^3$ psi | 33.6 | 32.3 | 45.3 | 44.8 | 50.9 | 44.4 | 28.3 | 25.1 |
| Flexural Modulus × $10^6$ psi | .792 | .635 | 1.72 | 1.61 | 1.95 | 1.83 | 1.51 | 1.43 |
| HDT at 264 psi °F. | 534 | 526 | 539 | 526 | 560 | 544 | 545 | 510 |
| Izod Impact ft.-lbs./in of notch | 2.5 | 2.6 | 1.5 | 1.6 | 0.95 | 0.86 | 0.75 | 0.73 |
| Tg °F. molded | 495 | 478 | — | — | — | — | — | — |
| annealed | 538 | 527 | 540 | 540 | 545 | 536 | 545 | 518 |
| Thermal Aging | | | | | | | | |
| Tensile Strength × $10^3$ psi | | | | | | | | |
| 250 hrs. at 500° F. | 29.2 | 25.0 | — | — | 32.7 | 28.9 | | |
| 1000 hrs. at 500° F. | 28.0 | 23.1 | — | — | 32.5 | 26.4 | | |
| Flexural Modulus × $10^6$ psi | | | | | | | | |
| 250 hrs. at 500° F. | .761 | .635 | — | — | 2.05 | 1.88 | | |
| 1000 hrs. at 500° F. | .766 | .659 | — | — | 1.94 | 1.88 | | |
| Tg °F. | | | | | | | | |
| 250 hrs. at 500° F. | 538 | 527 | — | — | 554 | 541 | | |
| 1000 hrs. at 500° F. | 554 | 543 | — | — | 554 | 543 | | |
| 400° F. Properties | | | | | | | | |
| Flexural Strength × $10^3$ psi | — | — | 29.1 | 27.9 | 36.1 | 31.1 | | |
| % R.T. Retention | — | — | 64 | 62 | 71 | 70 | | |
| Flexural Modulus × $10^6$ psi | — | — | 1.38 | 1.34 | 1.72 | 1.59 | | |
| % R.T. Retention | — | — | 81 | 83 | 88 | 87 | | |
| Flow; Cavity Pressure × $10^3$ psi | | | | | | | | |
| at 18 seconds | 12.7 | 15.4 | 5.0 | 11.7 | 13.5 | 19.1 | 0 | 11.4 |
| at 90 seconds | NR | NR | 0 | 9.5 | 0 | 20.3 | NR | NR |

*Polymer Weight: Melt compounded with Amide-Imide prior to injection molding.
NR: Not Run.
Glass Fibers: ⅛" PPG 3540.
Mineral Fibers: Wollastokup 1100 0.5.

All of the materials studied were molded on the 10 oz. Stokes injection molder under Table I molding conditions unless specified otherwise. A 10 oz. Stokes injection molder is fitted with a 1:1 compression thermoset screw which can hold approximately 365 grams of amide-imide polymer and copolymer (approximately 0.8 lbs.). Since each test tree weighs approximately 23 grams (neat parts) only 1/16th of the complete injection stroke (shot volume) is used during the molding evaluation. Under these conditions (18 second clamp), the total time the polymer is trapped in the barrel is approximately 7.2 minutes (total cycle is 27 seconds). This does not mean that the polymer is in the melt state for the complete 7.2 minutes due to the temperature gradient (front to rear) in the barrel. For a complete material transition (purge) 16-20 shots must be taken before collecting data.

Amide-imide polymer and copolymer flow, under molding conditions, is determined by its cavity pressure which is measured at a point farthest from the sprue. In this test, a pressure transducer is fitted behind a knock-out point located behind the flex bar. The higher the cavity pressure, the better the flow thus making for easier mold filling. To determine our amide-imide copolymer reactivity a plot of cavity pressure vs. cycle time is drawn. A stable or non-reactive resin will exhibit good flow characteristics under adverse molding conditions resulting in a melt insensitive to a change in cycle time. A reactive polymer will be cycle time dependent in that its viscosity increases with cycle time. This is illustrated by a steep negative cavity pressure slope. Amide-imide polymer and copolymer samples were all dried for approximately 16 hours at 300° F. in a hot air circulating oven containing a suitable desiccant. The amorphous polyamides were dried overnight in a vacuum oven at 230° F. Samples were dry blended together and stored under vacuum in sealed containers. (A-I Product define in Example 2.)

Amide-imide polymer and copolymer samples were cured in a Blue M hot air programmable oven under a 7 day cycle with 1 day at 320° F., 400° F., 450° F., 475° F. and 3 days at 495° F. Several tensile bars were cured under a 7 day cycle with 3 days at 500° F. These parts were measured for shrinkage. The 3 percent (total weight) Trogamid-T, Amidel and Copolyamide, amide-imide blends were cured at 500° F. and these materials were ASTM tested.

The following examples illustrate the preferred embodiment of the invention. It will be understood that the examples are for illustrative purposes only and do not purport to be wholly definitive with respect to conditions or scope of the invention.

EXAMPLE I

A 200 ml. round bottom 4-neck flask, equipped with a nitrogen inlet tube, stirrer, thermometer, and solids addition funnel, was charged with 99.9 parts by weight of (pbw) p,p'-oxybis(aniline) (OBA), 23.1 pbw metaphenylenediamine (MPDA) and 604 pbw N-methylpyrrolidone (NMP). When solution at room temperature (72° F.) was complete, 142.5 pbw 4-trimellitoyl anhydride chloride (4-TMAC), having a percent purity of 99.5 percent ±0.5 percent as determined from chloride content and 6.8 pbw of trimellitic acid anhydride (TMA) was added over 2.5 hours while maintaining a solution temperature of between about 77°-95° F. When addition was complete the solution was stirred for 3 hours during which time the solution viscosity increased to a Gardner-Holdt value of Z5+ or about 110 poises.

Solid polymer was obtained by first pouring the viscous solution into twice its volume of distilled water in a Waring blender and then filtering. The filtrate is washed with 5 increments of 3000 pbw each of distilled water to remove hydrogen chloride that had been generated during reaction.

The solid was dried under a vacuum of 20 inches of mercury for 24 hours at 122° F. The above material was heated for 2 hours in an oven set at 450° F. to give the final product.

EXAMPLE II

A 10 gal glass-lined Pfaudler kettle equipped with a water-cooled jacket and nitrogen inlet was charged with 9.87 lbs. of m-phenylenediamine, 0.35 lbs. of trimellitic anhydride and 59.2 lbs. of N-methylpyrrolidone. After solution had occurred under a nitrogen purge, an intimate blend of 9.52 lbs. of 4-trimellitoyl anhydride chloride and 9.17 lbs. of isophthaloyl dichloride was added over 2.5 hrs. keeping the temperature below 35° C. The resulting viscous solution was brought to 50° C. When the Gardner viscosity had reached a Z3 viscosity the solution was precipitated by passage through a Fitzpatrick comminuting mill. The polymer product was washed five times with deionized water followed by air-drying on a filter for 3 days. The product was then brought to a solids content of 98.3 percent by heating in a forced air oven for 2 hrs. at 470° F.

EXAMPLE III

Metaphenylenediamine (540 g) and acetic acid (900 ml) were placed in a five liter three-necked round bottom flask equipped with mechanical stirrer, pressure equalizing addition funnel and nitrogen sparge tube, and distillation head and condenser. The nitrogen sparge was set at 300 cc/min and 765 g of acetic anhydride was added over 5 min. This was followed by the addition of 415 g of isophthalic acid and 480 g of trimellitic anhydride. The temperature of the bottom half of the spherical heating mantle surrounding the flask was set at 700° F. and the top half of the mantle was heated with a Variac set at 50. After 105 min., 1730 ml of distillate was collected and the polymer had become very viscous. The heat was turned off and the polymer was cooled under nitrogen.

EXAMPLE IV

A 690 gram portion of dimethylacetamide was stirred and cooled to 5° C. with dry nitrogen purging to keep the system dry. An intimate mixture composed of 252.2 grams of 4-TMAC, 119.0 grams of p',p-methylene-bis-(aniline), and 120.0 grams of p,p'-oxybis(aniline) was then added to the solvent over a period of 30 minutes. The temperature of the reaction was allowed to rise to 50° C. At that temperature it was controlled by means of an ice bath. An additional 100 grams of DMAC were then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443 gram yield of the copolymer was obtained.

EXAMPLE V

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time the reaction was allowed to warm to 36° C. An additional 66.7 grams of NMP were added to wash in all solids, then the reaction mixture was heated to 50° C. and held at that temperature for 3½ hours. The solution was then filtered.

EXAMPLE VI

The general procedure for preparing a copolymer containing three diamines is illustrated by the reaction of OBA, MPDA and MBA and 4-TMAC in DMAC. Thus, a 242.0 gram portion of OBA (1.21 moles), a 130.7 gram portion of MPDA (1.21 moles) and a 239.6 gram portion of MBA (1.21 moles) were dissolved in 3,900 grams DMAC contained in a 6 liter flask equipped with a nitrogen purge, stirrer, addition funnel and thermometer. A 765 gram portion of 4-TMAC (3.63 moles) in flake or lump form was then added to the solution in portions over 90 minutes. The reaction exotherm was allowed to raise the temperature to about 35° C. The reaction temperature was maintained at 33°-38° C. for the remainder of the 4-TMAC addition using cooling water when necessary. After the TMAC addition was completed, any residual TMAC clinging to the addition funnel was completely washed into the reaction solution with 70 grams DMAC. A heating mantle was applied to the reaction flask and the temperature quickly raised (about 20 min.) to 50° C. The reaction solution was stirred at 50° C. for 90 minutes and then the solution precipitated by admixing with water. Prior to precipitation the solution viscosity was about 7.5 stokes (25° C., 20 percent solids). The polymer was precipitated in distilled water in a model D, W. J. Fitzpatrick Company, comminuting machine (Fitz mill). After precipitation the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°-35° C. for 12-15 hours.

EXAMPLE VII

A 78 gram amount of the copolymer in powdered form made according to the procedure set forth in Example I was heated at 550° F. for about 1 hour. It was then cooled and charged cold into a mold preheated in the press to about 600° F. to about 650° F. A maximum pressure of 4,200 psi was applied over a 25 minute period and thereafter the mold and contents cooled to 500° F. under a pressure of 2,100 psi and the molded item immediately ejected. A disk measuring 5½ inches in diameter and ⅛ inch thick had been formed.

EXAMPLE VIII

Neat amide-imide amorphous polyamide blends can be prepared by physically blending the constituents together, either pellet to pellet, powder to powder, powder to pellet, or pellet to powder with or without a compounding step prior to injection molding. It is preferred that the constituents are melt compounded; however, favorable results can be achieved without melt compounding.

The filled amide-imide amorphous polyamide blends can be prepared as described above or the amorphous polyamide can be dissolved in a solvent and spray coated or dip coated on the filler and/or reinforcement (graphite fibers, glass fibers, and mineral fillers). Trogamid-T is readily soluble in N-methyl-2-pyrrolidone (NMP). Thus a solution of about 1 to 5 percent Trogamid-T by weight of total solution can be coated on the reinforcement and/or filler. Table 4 compares 40 percent glass-filled amide-imides (Example II) which have been dry blended and melt compounded with an amorphous polyamide.

TABLE 4

| | | |
|---|---|---|
| Glass Content, % | 40 | 40 |
| Blend Procedure | dry | melt |
| % Amorphous Polyamide (Polymer Wgt.) | 5 | 5 |
| Physical Properties* | | |
| Tensile Strength × 10³ (psi) | 27.0 | 26.2 |
| Tensile Elongation % | 5.0 | 4.8 |
| Flexural Strength × 10³ (psi) | 43.1 | 44.4 |
| Flexural Modulus × 10⁶ (psi) | 1.86 | 1.83 |
| HDT (°F.) | 538 | 544 |
| Izod Impact (ft.-lb./in. of notch) | 1.0 | 0.86 |

*Annealed

EXAMPLE IX

An amide-imide resin (Example II preparation) was dry blended with 40 percent glass fibers from Pittsburg Plate Glass Corporation, identified as PPG 3540, and 1 percent PTFE and then melt compounded. This sample was dry blended with 1 to 5 percent by total weight of an amorphous polyamide (Trogamid-T) or 1.67 to 8.33 percent by weight of the amide-imide polymer weight and injection molded. Parts were annealed on a 7-day cycle, 320° F., 400° F., 450° F., 475° F., and 3 days at 495° F. Physical properties, molded part physical properties, and molded part shrinkage are given in Table 5 below.

TABLE 5

| | | | |
|---|---|---|---|
| Glass Content, % | | 40 | 40 |
| Amorphous Polyamide Content, % | | 0 | 1 |
| Part I.V. dl/g | 0.30 | | 0.30 |
| Thermal Properties | ASTM Method | | |
| Glass Transition Temperature (Tg), °F. | | | |
| As Molded | | 505 | 493 |
| Annealed* | | 532 | 525 |
| Annealed Tg Increase | | 27 | 32 |
| Physical Properties* | | | |
| HDT, °F. | D-48 | 549 | 540 |
| Tensile Strength, psi | D-1708 | 20,400 | 23,600 |
| Tensile Elongation, % | D-1708 | 5.6 | 6.8 |
| Flexural Modulus, psi | D-790 | 1,970,000 | 1,930,000 |
| Flexural Strength, psi | D-790 | 45,000 | 46,600 |
| Izod, ft-lbs/in of notch | D-256 | 0.89 | 0.86 |
| Molding Results | | | |
| Total Shrinkage (mils/in) | | 0.7 | 0.7 |
| Cavity Pressure, psi | | 10,300 | 12,600 |

EXAMPLE X

An amide-imide (Example II preparation) resin was dry blended with 40 percent PPG 3540 glass fibers and 1 percent PTFE and melt compounded. The sample was dry blended with 3 percent by total weight of Trogamid-T, Amidel, or Copolyamide. Parts were annealed on a 7-day cycle with 3 days at 500° F. Physical properties, flow, and shrinkage dates are shown below in Table 6.

TABLE 6

Amide-Imide (Example II Preparation)

| Amorphous Polyamide Content | Control | Trogamid-T | Amidel | Copoly-amide |
|---|---|---|---|---|
| Total weight basis, % | 0 | 3 | 3 | 3 |
| A-I Polymer weight basis, % | 0 | 5 | 5 | 5 |
| Cavity Pressure, psi | 10,300 | 16,900 | 21,100 | 18,800 |
| Total Shrinkage, mils/inch | 0.7 | 1.7 | 1.7 | 1.7 |
| Physical Properties* | | | | |
| Tensile Strength, psi | 30,500 | 27,000 | 25,700 | 24,100 |
| Tensile Elongation, % | 5.5 | 5.0 | 4.3 | 4.2 |
| Flexural Strength, psi | 50,900 | 43,100 | 44,100 | 43,200 |
| Flexural Modulus, psi | 1,960,000 | 1,860,000 | 1,750,000 | 1,850,000 |
| HDT, °F. | 555 | 538 | 519 | 518 |
| Izod Impact, Ft-lbs/in notch | 0.9 | 1.0 | 0.9 | 0.9 |
| Annealed Tg, °F. | 532 | 520 | 523 | 523 |

*Cure Cycle: 1 day at 320° F., 400° F., 450° F., 475° F.; 3 days at 500° F.

EXAMPLE XI

Figure 4:
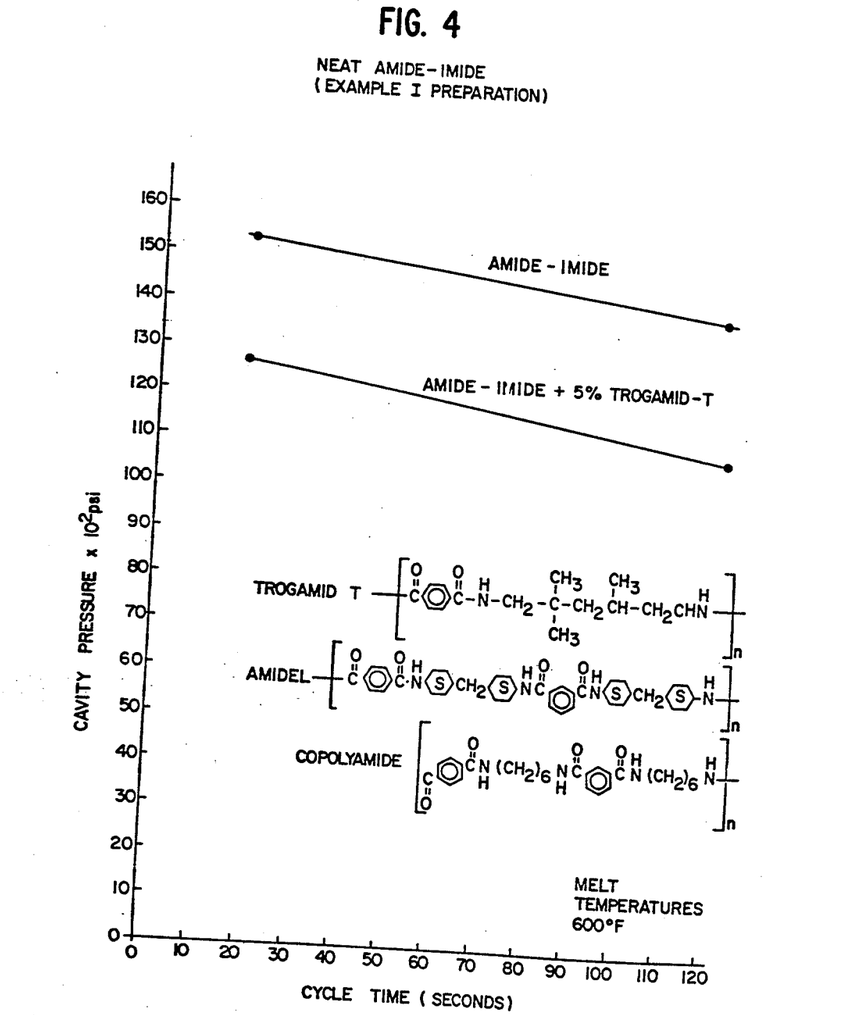
Figure 5:
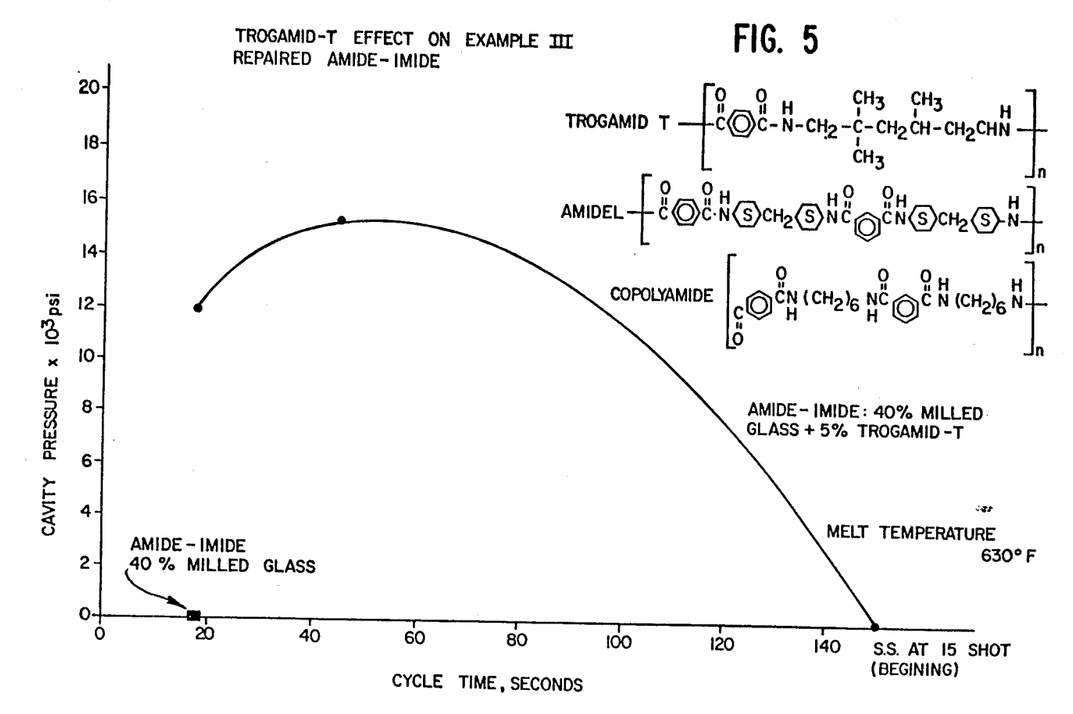

An amide-imide resin prepared as in Example I which was melt compounded with 0.5 percent PTFE or 30 percent PPG 3540 glass fibers and 1 percent PTFE and pelletized. These materials were dry blended with an amorphous polyamide (Trogamid-T). The parts injection molded from these materials were annealed under a 7-day cycle with 3 days at 500° F. Physical properties, flow, and shrinkage data are given in Table 7 below. FIG. 4 illustrates the difference in flow and melt stability the Trogmaid-T added to the 30 percent glass filled amide-imide resin. FIG. 5 illustrates the difference in flow and melt stability with Trogamid-T added to an amide-imide resin without glass fiber filler.

EXAMPLE XII

An amide-imide Example III preparation) resin which contained 40 percent milled glass and 1 percent PTFE was melt compounded and dry blended with 5 percent by weight of Trogamid-T. Parts were molded with and without Trogamid-T. The control (no Trogamid-T) was so viscous that it stalled the injection molder screw during reciprocation, thus, the run was aborted to prevent the screw from seizing. When 5 percent (total weight) Trogamid-T was dry blended into this material, a cavity pressure of 12,000 psi was obtained. The melt reactivity during plastication was inhibited as illustrated in FIG. 5.

EXAMPLE XIII

A neat amide-imide (Example I preparation) was melt compounded with 5 percent and 20 percent by weight of Trogamid-T. Parts were molded on the 10 oz. Stokes injection molder at about 630° F. The 5 percent Trogamid-T amide-imide material and the control were annealed at 500° F. for 3 days prior to testing. The 20 percent Trogamid-T amide-imide blend parts distorted during the 500° F. annealing processing, thus, properties were not measured. At the 20 percent Trogamid-T loading the as molded amide-imide part Tg was 410° F. (210° C.) and after annealing it rose 40° F. to 450° F. (232° C.). The 20 percent Trogamid-T amide-imide blend maximum Tg was 450° F., some 50° F. below the maximum annealing temperature, thus examplifying the distortion during annealing due to stress relaxation of the part. The amide-imide controls as molded and annealed Tg's were 495° F. and 531° F. while the 5 percent Trogamid-T amide-imide blend had as molded and annealed Tg's of 489° F. and 523° F.

EXAMPLE XIV

N-methyl-2-pyrrolidone (NMP) is a solvent for both polymers of interest-polyamide-imide and Trogamid-T. A 27.5 percent solids solution of Trogamid-T in NMP was prepared as follows. The NMP 725 grams) was

TABLE 7

Amide-Imide (Example I)

| | ASTM Method | | | | |
|---|---|---|---|---|---|
| Glass Content, % | | 30 | 30 | 0 | 0 |
| Amorphous Polyamide Content | | | | | |
| Total Weight Basis, % | | 0 | 5.00 | 0 | 5 |
| Amide-Imide Weight Basis, % | | 0 | 7.14 | 0 | 5 |
| Cavity Pressure, psi | | 8,800 | 15,500 | 14,500 | 16,400 |
| Total Shrinkage, (mils/in) | | 0.7 | 4.4 | 7.0 | 8.7 |
| Physical Properties* | ASTM Method | | | | |
| Tensile Strength, psi | D-1708 | 31,200 | 25,300 | 28,400 | 27,200 |
| Tensile Elongation, % | D-1708 | 7.6 | 7.5 | 15.4 | 16.6 |
| Flexural Modulus, psi | D-790 | 1,790,000 | 1,490,000 | 710,000 | 680,000 |
| Flexural Strength, psi | D-790 | 47,100 | 42,600 | 33,600 | 32,300 |
| Izod, ft-lbs/in of notch | D-256 | 1.61 | 1.77 | 2.45 | 2.71 |
| Thermal Properties | | | | | |
| Tg, as molded, °F. | | 502 | 464 | 495 | 481 |
| Tg, annealed, °F. | | 540 | 507 | 531 | 523 |
| HDT, °F. | D-48 | 513 | 515 | 535 | 535 |

*7-Day Cure Cycle: 1 day at 320° F., 400° F., 450° F., 475° F.; 3 days at 500° F.

heated to 180° F., and stirred with a high shear blade mixer with sufficient speed to keep the Trogamid-T pellets from agglomerating when added to the solvent. The Trogamid-T pellets were added to the hot solvent over a 20-minute period. After ≈1½ hours mixing, all pellets were dissolved. Mixing was continued for 2 hours after all pellets appeared to be dissolved. The solution was allowed to cool and sit 16 hours before using.

The Trogamid-T solution described above was blended with a polyamide-imide/NMP solution (27.5 percent solids) at a 95:5 weight ratio. The polyamide-imide solution was first heated to 150° F. The Trogamid solution was thus added, and the blend was stirred with a high shear mixer for four hours. The blended solution was allowed to cool and sit 16 hours before using.

The blended solutions of polyamide-imide/Trogamid-T were used to coat graphite fiber woven fabric. The laminates formed from these blends and a control are listed in the Table below.

TABLE 8

| Sample | Molded Pressure, psi | Short Beam Shear (SBS), ksi |
|---|---|---|
| Control | 3000–4000 | 10–11 |
| 82-01-13-01 | 2000 | 11.45 |
| 82-01-13-02 | 1500 | 11.69 |
| 82-01-14-01 | 1000 | 11.50 |

Laminates using 100 percent polyamide-imide require molding pressures of 3000 to 4000 psi to obtain void free parts with good surface appearance. Laminates utilizing the polyamide-imide/Trogamid-T blend were molded at pressures of 2000, 1500, and 1000 psi: mold pressure respectively. A good quality laminate will have short beam shear (SBS) strength of 10–11 ksi as molded. The blend laminates have SBS strengths above 11 ksi.

We claim:

1. A laminate comprising amide-imide copolymer solution impregnated graphite woven fabric layers or glass fabric layers, said copolymer comprising units of:

and units of:

and including up to about 20 percent by weight of amorphous polyamide wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

2. The laminate of claim 1 wherein the amorphous polyamide comprises recurring units having the following structure:

wherein Y is a straight chain of one to six methylene groups, such chain being substituted by at least one alkyl group, the total number of side chain carbon atoms introduced by the alkyl substitution being at least one.

3. A laminate comprising amide-imide copolymer solution impregnated graphite woven fabric layers or glass fabric layers, said copolymer comprising units of:

and units of:

and units of:

wherein the molar ratio of C units to the total of A and B units is about 20:80 to about 80:20 and wherein $R_3$ is the same as $R_1$ and as $R_2$ and X is a divalent aromatic radical and including up to about 20 percent by weight of amorphous polyamide wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

4. The laminate of claim 3 wherein X is

5. The laminate of claim 3 wherein the amorphous polyamide comprises both aromatic and aliphatic hydrocarbon moieties.

6. The laminate of claim 3 wherein the amorphous polyamide comprises recurring units having the following structure:

wherein Y is a straight chain of one to six methylene groups, such chain being substituted by at least one alkyl group, the total number of side chain carbon atoms introduced by the alkyl substitution being at least one.

* * * * *

UNITED STATES PATENT OFFICE
CERTIFICATE OF CORRECTION

Patent No. 4,467,011　　　　　　　Dated August 21, 1984

Inventor(s) BROOKS, GARY T. - COLE, BILL W.

It is certified that error appears in the above-identified patent and that said Letters Patent are hereby corrected as shown below:

| Column | Line | | | |
|---|---|---|---|---|
| 1 | 36 | After "cross-links" delete -- links -- | | |
| 3 | 52 | "237" should be -- 273 -- | | |
| 4 | 21-22 | "ft-lbs." should be -- ft.-lbs. | | |
| 14 | 37 | "0.30" (first column) should be -- 0.30 -- (third column) | | |
| 15 | 38 | "the" (first occurrence) should be -- with -- | | |
| 16 | 3 | After "amide-imide" Add ( -- | | |
| 16 | 41 | After "NMP" Add ( -- | | |
| 14 | 33-57 | 2nd half of Table 5 was omitted should be -- | | |

| | | |
|---|---|---|
| Glass Content, % | 40 | 40 |
| Amorphous Polyamide Content, % | 3 | 5 |
| Part I.V. dl/g | 0.30 | 0.32 |
| Thermal Properties | | |
| Glass Transition Temperature (Tg), °F | | |
| As Molded | 480 | 466 |
| Annealed* | 523 | 509 |
| Annealed Tg Increase | 43 | 43 |
| Physical Properties* | | |
| HDT, °F | 533 | 524 |
| Tensile Strength, psi | 20,800 | 18,500 |
| Tensile Elongation, % | 6.7 | 5.6 |
| Flexural Modulus, psi | 1,850,000 | 1,730,000 |
| Flexural Strength, psi | 41,700 | 35,800 |

UNITED STATES PATENT OFFICE
CERTIFICATE OF CORRECTION

Patent No. 4,467,011　　　　　　　　　　　Dated August 21, 1984

Inventor(s) BROOKS, GARY T. - COLE, BILL W.

It is certified that error appears in the above-identified patent and that said Letters Patent are hereby corrected as shown below:

|  |  |  |
|---|---|---|
| Izod, ft-lbs/in of notch | 0.88 | 0.84 |
| Molding Results |  |  |
| Total Shrinkage (mils/in) | 1.0 | 1.3 |
| Cavity Pressure, psi | 16,800 | 21,500 |

\* Cure cycle days at $320°$, $400°F$, $450°F$, $475°F$, and 3 days at $495°F$. --

Signed and Sealed this

Second Day of July 1985

[SEAL]

Attest:

DONALD J. QUIGG

Attesting Officer　　　Acting Commissioner of Patents and Trademarks